United States Patent

Hirota et al.

[11] Patent Number: 6,034,726
[45] Date of Patent: Mar. 7, 2000

[54] IMAGE GENERATING DEVICE HAVING AUTOMATIC FOCUS CORRECTION BASED ON A DETECTED CHANGE IN AN IRIS POSITION OR IN A ZOOM LENS POSITION

[75] Inventors: Katsuaki Hirota; Naoki Kawaguchi, both of Kanagawa, Japan

[73] Assignee: Sony Corporation, Tokyo, Japan

[21] Appl. No.: 08/683,855

[22] Filed: Jul. 19, 1996

[30] Foreign Application Priority Data

Jul. 21, 1995 [JP] Japan ................................. 7-185719

[51] Int. Cl.[7] .......................... H04N 5/232; G03B 13/00
[52] U.S. Cl. ......................................................... 348/347
[58] Field of Search .................................. 348/347, 345; 396/77, 80, 82, 91, 93

[56] References Cited

U.S. PATENT DOCUMENTS

| | | | |
|---|---|---|---|
| 4,748,509 | 5/1988 | Otake | 348/347 |
| 5,075,713 | 12/1991 | Sakata | 396/80 |
| 5,144,492 | 9/1992 | Iijima | 359/698 |
| 5,182,649 | 1/1993 | Miyazaki | 348/349 |
| 5,574,502 | 11/1996 | Haruki | 348/347 |
| 5,629,735 | 5/1997 | Kaeda | 348/350 |

*Primary Examiner*—Bryan Tung
*Attorney, Agent, or Firm*—Hill & Simpson

[57] ABSTRACT

A lens driving device for an image pickup apparatus in which there is no problem of defocusing of an object caused by changes in the light stop state after manual or automatic focusing with respect to an object. The lens driving device includes a focusing correction amount calculation circuit 27 for calculating the amount of focus correction from the focus position from a focus position detection circuit 26 responsive to the zooming position from a zooming position detection circuit 28 and to a signal $S_1$ from a light stop value sensor 13. The lens driving device also includes an adder 24 for summing the focusing correction amount to the focusing displacement from an autofocusing displacement calculation circuit 21 or a manual focusing displacement calculation circuit 22 via a signal switching unit 23. The resulting sum is outputted as a displacement of a focusing lens.

19 Claims, 2 Drawing Sheets

IMAGE GENERATING DEVICE HAVING AUTOMATIC FOCUS CORRECTION BASED ON A DETECTED CHANGE IN AN IRIS POSITION OR IN A ZOOM LENS POSITION

BACKGROUND OF THE INVENTION

1. Field of the Invention

This invention relates to a lens driving device having a mechanism for performing a focusing operation and a zooming operation, and to an image pick-up apparatus employing this lens driving device.

2. Description of the Related Art

Heretofore, an image pick-up apparatus, such as a video camera, performs a zooming operation and a focusing operation by a structure including a zoom lens within a lens block and a focusing lens outside the lens block. The focusing lens provided outside the lens block is termed a front focusing lens.

Nowadays, the zooming and focusing operations are performed by a structure having the zoom lens and the focusing lens within the lens block. The focusing lens provided within the lens block is termed an inner focusing lens.

Among the systems of focusing with respect to an object with variations in the zoom lens position, there are a so-called manual focusing system in which an operator arbitrarily sets the focus position by a manual operation, and a so-called auto-focusing system in which the focusing operation is performed automatically using a detected output of imaging signals. In the autofocusing system, the operation of correcting the focus position for focusing with respect to the object depending on the distance between the zooming position and the distance up to the object is termed a zoom tracking operation.

In the above imager, if, after manual focusing with respect to the object and securing the focus lens, the state of an iris adjusting the light volume from the object is changed, the focus for the object tends to be deviated.

Moreover, in zoom tracking for automatic focusing, the focus for the object tends to be deviated depending on the state of the iris.

SUMMARY OF THE INVENTION

It is therefore an object of the present invention to provide a lens driving device and an image pick-up apparatus employing this lens driving device in which focusing with respect to an object may be achieved even if the state of the iris is changed.

In a lens driving device according to the present invention, focus correction amount calculation means is responsive to a light stop value of an iris detected by a light stop value sensor to calculate a focus correction amount for correcting the position of a focusing lens, using the focus position detected by focus position detection means, based on displacement of the focusing lens from focusing lens driving means, for controlling the focus position responsive to the iris light stop value.

Moreover, zoom position detection means detects the zooming position, based on the displacement of a zoom lens from zoom lens driving means, while the focusing correction amount calculation means is responsive to the light stop value from the light stop value detection means and the zoom position from the zoom position detection means for calculating the focus correction amount using the focus position detected by the focus position detection means for controlling the focus position responsive to the light stop value from the iris and the zoom position.

In an image pickup apparatus according to the present invention, focus correction amount calculation means is responsive to the iris light stop value detected by light stop value detection means to calculate a focus correction amount, using the focus position detected by focus position detection means, based on the displacement of a focusing lens from focusing lens driving means. As the focus position is controlled by the focus correction amount, the light from an object via the focusing lens is received and converted into pixel signals by image pick-up means. Picture signals derived from the pixel signals by signal processing means are outputted for image pick-up while the focus position is controlled responsive to the iris light stop value.

In addition, zoom position detection means detects the zoom position based on the displacement of the zoom lens from the zoom lens driving means, while the focus correction amount calculation means is responsive to the light stop value by light stop value detection means and the zoom position from the zoom position detection means to calculate a focusing correction amount, using the focus position detected by focus position detection means. In this manner, an image pick-up operation is performed while the focus position is controlled responsive to the iris light stop value.

With the lens driving device according to the present invention, the focus correction amount for correcting the focus position is calculated, responsive to the iris light stop value, based on the displacement of the focusing lens, for controlling the focusing lens position depending on the iris light stop value. This eliminates defocusing with respect to the object otherwise caused by changes in the light stop value. Specifically, for manual focusing, it becomes possible to avoid defocusing with respect to an object otherwise caused by changes in the light stop value after focusing with respect to the object. For autofocusing, it becomes possible to avoid defocusing otherwise caused by changes in the light stop value during zoom tracking by an inner focusing lens.

By calculating the focus correction amount responsive to the zoom position and the light stop value for controlling the focusing lens position responsive to the light stop value and the zoom position, it becomes possible to avoid defocusing otherwise caused by changes in the light stop value and in the zoom position.

With the image pick-up apparatus according to the present invention, the focus correction amount is calculated responsive to the light stop value for correcting the focusing lens position and the object light via the focusing lens is received and converted into output picture signals, so that the image pickup operation may proceed as the focusing lens position is controlled responsive to the light stop value. Thus it becomes possible to avoid defocusing otherwise caused by changes in the light stop value during imaging.

Also, the focusing correction amount is calculated responsive to the zooming position and the light stop value for correcting the focusing lens position and the object light via the focusing lens is received and converted into output picture signals, so that the image pickup operation may proceed as the focusing lens position is controlled responsive to the light stop value and the zoom lens position. Thus it becomes possible to avoid defocusing otherwise caused by changes in the light stop value of the zooming position during imaging.

DESCRIPTION OF THE PREFERRED EMBODIMENTS

Figure 1:
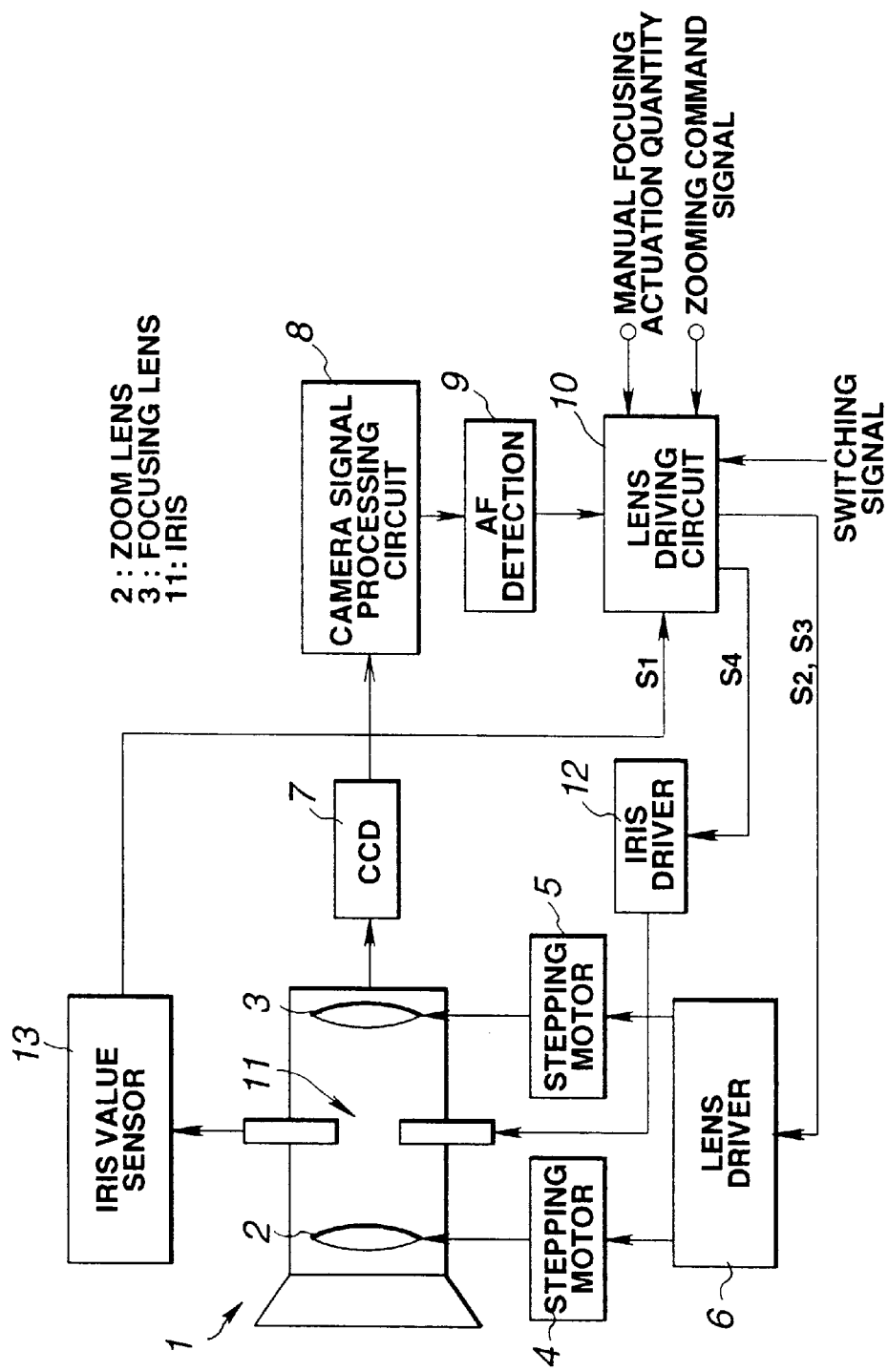
FIG. 1 is a schematic view showing an embodiment of an image pick-up apparatus according to the present invention.

Referring to the drawings, preferred embodiments of the present invention will be explained in detail.

Figure 2:
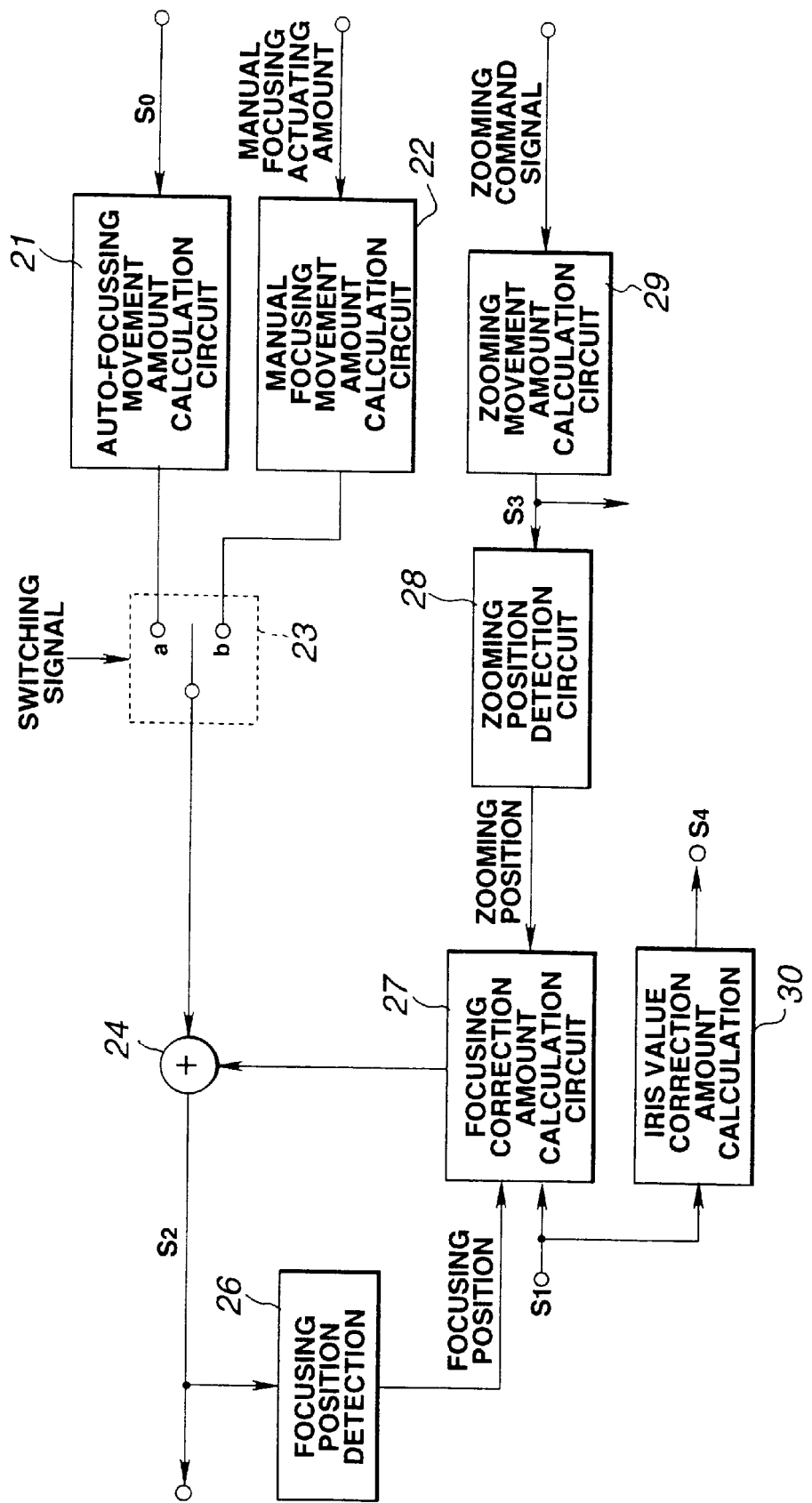
FIG. 2 is a schematic view showing an embodiment of a lens driving circuit in the lens driving device according to the present invention.

FIG. 1 shows, in a block diagram, an arrangement of an image pick-up apparatus according to an embodiment of the present invention, while FIG. 2 shows, in a schematic block diagram, a lens driving circuit within the lens driving device according to the present invention.

The lens driving device according to the present invention includes a stepping motor 5, as focusing lens driving means for moving a focusing lens 3 designed for adjusting the focal point with respect to an object, and a focus position detection circuit 26 for detecting the focus position based on the displacement of the focusing lens 3 moved by the stepping motor 5. The lens driving device also includes a light stop value sensor 13 for detecting the light stop value of an iris 11 and a focus correction amount calculation circuit 27 for calculating the focus correction amount for correcting the focusing position from the focus position calculation circuit 26.

The above lens driving device further includes a stepping motor 4 for moving the zooming lens 2 adapted to vary the imaging field angle and a zoom position detection circuit 28 for detecting the zoom position based on the displacement of the zoom lens 2 moved by the stepping motor 4. The focus correction amount calculation circuit 27 calculates the amount of focus correction for correcting the focus position from the focus position detection circuit 26 depending on the light stop value from the light stop value sensor 13 and the zoom position from the zoom position detection circuit 28.

The image pick-up apparatus includes, in addition to the lens driving device having the above components, a CCD 7 for receiving the light from the object via the focusing lens 3 and a camera signal processing circuit 8 for processing pixel signals from the CCD 7 for outputting picture signals, as shown in FIG. 1. The operation of the image pick-up apparatus of FIG. 1 and the lens driving circuit of FIG. 2 will now be explained.

In the image pick-up apparatus, shown in FIG. 1, the light from the object is received by and imaged on a solid-state imaging element, as an imaging device, specifically a charge-coupled device (CCD) 7, via the focusing lens 3 and the zoom lens 2 in the lens block 1. The CCD 7 is an image sensor made up of plural light-receiving units, or a so-called imager. The amount of light received and detected by the CCD 7 is converted into electrical signals. The electrical signals, outputted by this CCD 7, are outputted to the camera processing circuit 8.

The camera signal processing circuit 8 performs signal processing, using the input electrical signals, for generating standard color television signals of the NTSC system or the PAL system, obtained on multiplexing luminance signals Y and two chroma signals R-Y and B-Y used in, for example, color television broadcasting. These color television signals are outputted as video signals.

In imaging an object, the zoom lens 2 is used for varying the imaging field angle, while the focusing lens 3 is used for adjusting the focal point with respect to the object. This zoom lens 2 is driven by the stepping motor 4 driven by a control signal from a lens driver 6 so as to be thereby controlled in its position for varying the imaging field angle.

The focusing lens 3 is driven by the stepping motor 5 driven by a control signal from the lens driver 6 so as to be thereby controlled in its position for adjusting the focal point with respect to the object. Moreover, the iris 11 is driven by an iris driver 12 for adjusting the light volume from the object. The light stop value from the iris 11 is detected by the light stop value sensor 13. The detected iris light stop value is sent as a signal $S_1$ to a lens driving circuit 10.

The camera signal processing circuit 8 outputs luminance signals which are sent to an autofocusing detector (AF detector 9) for detecting high-frequency components $S_0$ in the video signal. These high-frequency components $S_0$ are sent to the lens driving circuit 10.

The lens driving circuit 10 calculates the displacement of the focusing lens 3 during autofocusing from the high-frequency components $S_0$ from the AF detector 9 and detects the position of the focusing lens 3 from the displacement of the focusing lens 3. The lens driving circuit 10 also calculates the displacement of the focusing lens 3 during manual focusing from the manual focusing actuating amount for detecting the position for the focusing lens 3.

The lens driving circuit 10 has been fed with a signal $S_1$ from the light stop value sensor 13, that is a light stop value from the iris 11. The lens driving circuit 10 is responsive to changes in the light stop value $S_1$ to generate a signal $S_2$ specifying the displacement of the focusing lens 3 for moving the focusing lens 3 for focusing with respect to the object. The lens driver 6 controls the driving of the stepping motor 5 based on the signal $S_2$ for moving the focusing lens 3 for focusing with respect to the object.

During zooming, a zoom command signal is supplied to the lens driving circuit 10. The lens driving circuit 10 is responsive to the zoom command signal to generate a signal $S_3$ specifying the displacement of the zoom lens 2 designed for moving the zoom lens 2. This signal $S_3$ is sent to the lens driver 6. The lens driver is responsive to the signal $S_3$ to control the driving of the stepping motor 4 for controlling the movement of the zoom lens 2.

The lens driving circuit 10 is specifically explained.

During autofocusing, the high-frequency components $S_0$ (amount of autofocusing actuation) from the AF detector 9 of FIG. 1 are supplied to an autofocusing displacement calculation circuit 21 of FIG. 2. The autofocusing displacement calculation circuit 21 calculates the displacement of the focusing lens 3 during autofocusing. The displacement of the focusing lens 3, thus calculated, is sent to a terminal a of a signal switching unit 23.

During manual focusing, the amount of manual focusing actuation is supplied to a manual focusing displacement calculation circuit 22. This manual focusing arcuation amount is the displacement of the focusing lens 3 obtained on mechanically or electrically detecting the position of displacement of the focusing lens 3 on manual focusing or the rotational angle of a focusing ring designed for moving the focusing lens 3. This causes the manual focusing displacement calculation circuit 22 to calculate the displacement of the focusing lens 3 during the manual focusing operation. The displacement of the focusing lens 3, thus calculated, is sent to a terminal b of the signal switching unit 23.

The signal switching unit 23 is responsive to a changeover signal to be set to its contact a or to its contact b during autofocusing and during manual focusing, respectively. With the signal switching unit 23 thus set, the displacement of the focusing lens 3 during the autofocusing or during manual focusing is sent to an adder 24. An output of the adder 24 is sent to a focusing position detection circuit 26 and to the lens driver 6. The focusing position detection circuit 26 is responsive to the displacement of the focusing lens 3 for detecting the focus position and outputs a focus position signal. This focus position signal is sent to the focus correction amount calculation circuit 27.

This focus correction amount calculation circuit 27 is fed with the signal $S_1$ from the light stop value sensor 13, that is the light stop value of the iris 11. This focus correction amount calculation circuit 27 calculates the amount of focusing correction for correcting the position of the focusing lens 3 for achieving focusing with respect to the object responsive to changes in the signal $S_1$, with the aid of the focus position signal, and outputs the calculated focus correction amount to the adder 24.

The signal $S_1$ is also supplied to a light stop value correction amount calculation circuit 30. The light stop value correction amount calculation circuit 30 is responsive to the signal $S_1$ to calculate the correction amount for the light stop value and outputs the calculated light stop correction amount as a signal $S_4$ to an iris driver 12.

The adder adds the focusing correction amount to the displacement of the focusing lens 3 outputted via the signal switching unit 23. The displacement of the focusing lens 3, to which has been added the above focus correction amount, is sent as signal $S_2$ to the lens driver 6. This enables the position of the focusing lens 3 to be controlled in order to effect focusing with respect to the object at all times even if the light stop value of the iris 11 is changed.

If a function for finding the amount of correction for correcting the position of the focusing lens 3 responsive to the light stop value of the iris 11 is f, the amount of focusing correction responsive to the light stop value of the iris 11 is represented by the equation (1):

$$\text{(amount of focusing correction)} = f(\text{light stop value}) \quad (1)$$

The case of using also the zoom position for controlling the position of the focusing lens 3 responsive to changes in the light stop value of the iris 11 is now explained.

The zoom command signal, supplied during zooming, is sent to a zoom displacement calculation circuit 29 of the lens driving circuit 10. The zoom displacement calculation circuit 29 calculates the displacement of the zoom lens 2. The displacement of the zoom lens 2, thus found, is sent to a zoom position detection circuit 28, while being sent as signal $S_3$ to the lens driver 6. The zoom position detection circuit 28 is responsive to the displacement of the zoom lens 2 to detect the zoom position to output a zoom position signal. This zoom position signal is supplied to the focus correction amount calculation circuit 27. The zoom position may also be detected by a sensor.

The focus correction amount calculation circuit 27 is fed not only with the zoom position signal but also with the signal $S_1$ from the light stop value sensor 13 specifying the light stop value of the iris 11 and with a focus position signal from the focus position detection circuit 26. Using the focusing position signal, the focus correction amount calculation circuit 27 calculates the amount of focusing correction, responsive to changes in the signal $S_1$ and the zoom position signal, for allowing focusing with respect to the object, and outputs the calculated focusing correction amount to the adder 24. The signal $S_1$ is also supplied to the light stop value correction amount calculation circuit 30, which then calculates the correction amount of the light stop value responsive to the signal $S_1$ and outputs the calculated amount as signal $S_4$ to the iris driver 12. The adder 24 adds the focusing correction amount to the displacement of the focusing lens 3 outputted via the signal switching unit 23. The displacement of the focusing lens 3, to which has been added the focusing correction amount, is sent as signal $S_2$ to the lens driver 6. This enables the position of the focusing lens 3 to be controlled in order to effect focusing with respect to the object at all times even if the position of the zoom lens 12 and the light stop value of the iris 11 are changed.

If a function for finding the amount of correction for correcting the position of the focusing lens 3 responsive to the light stop value of the iris 11 is f, and a function for finding the amount for correction for correcting the position of the focusing lens 3 responsive to the zoom position is g, the amount of focusing correction responsive to the light stop value of the iris 11 and the zooming position is represented by the equation (2):

$$\text{(amount of focusing correction)} = f(\text{light stop value}) \, g(\text{zoom position}) \quad (2)$$

For finding the focusing correction amount, the method of using a data storage table may also be employed in addition to the method of using the equations (1) and (2). Any method may be used provided that such method enables calculation of the focus correction amount associated with the characteristics of the focusing lens 3.

In the lens driving device and the image pick-up apparatus of the above-described embodiments, part of the focusing lens driving means and the zoom lens driving means are integrated and represented as the lens driver 6. This lens driver 6, however, may also be separated into a lens driver for driving control of the focusing lens 3 and a lens driver for driving control of the zoom lens 2.

We claim:

1. A lens driving device comprising:

focusing lens driving means for focusing a lens to adjust a focal point of the lens;

focus position detection means for detecting a focus position of said lens;

light stop value detection means for detecting a light stop value of an iris and for detecting changes in the light stop value;

focusing correction calculation means for calculating a focusing correction amount for said lens based on the detected changes in light stop value from said light stop value detection means without changing a focus detection area; and iris correction means for changing the light stop value to reflect the detected changes in the light stop value.

2. The lens driving device as claimed in claim 1 further comprising:

zoom lens driving means for shifting a position of a zoom lens; and zoom position detecting means for detecting a shifted position of said zoom lens;

said focusing correction amount calculating means calculating the focusing correction amount based on the light stop value and a shifted position of said zoom lens.

3. The lens driving device as claimed in claim 2 wherein said focus position detection means is comprised of separate autofocusing displacement calculation means and manual focusing displacement calculation means.

4. The lens driving device as claimed in claim 2 wherein said focus correction amount calculation means performs calculations using said light stop value from said light stop value detection means and said zooming position by said zooming position detection means.

5. The lens driving device as claimed in claim 2 wherein said focus correction amount calculation means has a data table for correlating the light stop value from said light stop value detection means and said zooming position from said zooming position detection means with said focusing correction amount.

6. The lens driving device as claimed in claim 1 wherein said focus position detection means is comprised of separate autofocusing displacement calculation means and manual focusing displacement calculation means.

7. The lens driving device as claimed in claim 1 wherein said focus correction amount calculation means performs calculations using said light stop value from said light stop value detection means.

8. The lens driving device as claimed in claim 1 wherein said focus correction amount calculation means has a data table for correlating the light stop value from said light stop value detection means with said focusing correction amount.

9. An image pick-up apparatus comprising:
   focusing lens driving means for focusing a lens to adjust a focal point of the lens;
   focusing position detection means for detecting a focusing position of said lens;
   light stop value detection means for detecting a light stop value of an iris and for detecting changes in the light stop value;
   focusing correction amount calculation means for calculating a focusing correction amount for said lens based on the detected changes in light stop value from said light stop value detection means without changing a focus detection area;
   iris correction means for changing the light stop value to reflect the detected changes in the light stop value;
   image pickup means for receiving light from said object via said focusing lens for converting the received light into pixel signals; and
   signal processing means for processing the pixel signals from said image pickup means for outputting picture signals.

10. The image pickup apparatus as claimed in claim 9 further comprising:
   zoom lens driving means for shifting a position of said zoom lens; and
   zoom lens position detection means for detecting a shifted position of said zoom lens;
   said focusing correction amount calculation means calculating the focusing correction amount based on the light stop value and a shifted position of said zoom lens.

11. The image pickup apparatus as claimed in claim 10 wherein said focus position detection means is comprised of autofocusing displacement calculation means calculation means and manual focusing displacement calculation means.

12. The image pickup apparatus as claimed in claim 10 wherein said focus correction amount calculation means performs calculations using said light stop value from said light stop value detection means and said zooming position by said zooming position detection means.

13. The image pickup apparatus as claimed in claim 10 wherein said focus correction amount calculation means has a data table for correlating the light stop value from said light stop value detection means and said zooming position from said zooming position detection means with said focusing correction amount.

14. The image pickup apparatus as claimed in claim 9 wherein said focus position detection means is comprised of separate autofocusing displacement calculation means and manual focusing displacement calculation means.

15. The image pickup apparatus as claimed in claim 9 wherein said focus correction amount calculation means performs calculations using said light stop value from said light stop value detection means.

16. The image pickup apparatus as claimed in claim 9 wherein said focus correction amount calculation means has a data table for correlating the light stop value from said light stop value detection means with said focusing correction amount.

17. A method of generating image information comprising the steps of:
   adjusting a focal point of a lens;
   detecting a focus position of the lens;
   adjusting a position of an iris;
   detecting a light stop value of the iris;
   determining a focus correction value based on a detected light stop value without changing a focus detection area;
   adjusting a focus of the lens based on the focus correction value;
   detecting a change in the light stop value of the iris;
   correcting the position of the iris to reflect any detected change in the light stop value;
   determining a new focus correction value based upon the detected change in the light stop value without changing the focus detection area; and
   readjusting the focus of the lens based upon the new focus correction value.

18. A method of generating image information comprising the steps of:
   adjusting a focal position of a lens;
   adjusting a zoom lens position;
   detecting the zoom lens position;
   adjusting a position of an iris;
   detecting a light stop value of the iris;
   correcting the position of the iris to reflect any detected change in the light stop value;
   determining a focus correction value based on a detected zoom lens position and the detected light stop value without changing a focus detection area;
   adjusting a focus of the lens based on the focus correction value;
   detecting a change in the light stop value of the iris;
   determining a new focus correction value based upon the detected change in the light stop value without changing the focus detection area; and
   readjusting the focus of the lens based upon the new focus correction value.

19. The method of generating image information of claim 18, wherein said step of detecting a focus position of the lens comprises generating focus position information with a first circuit if in a manual focus mode and generating focus position information with a second circuit if in an automatic focus mode.

* * * * *